United States Patent Office

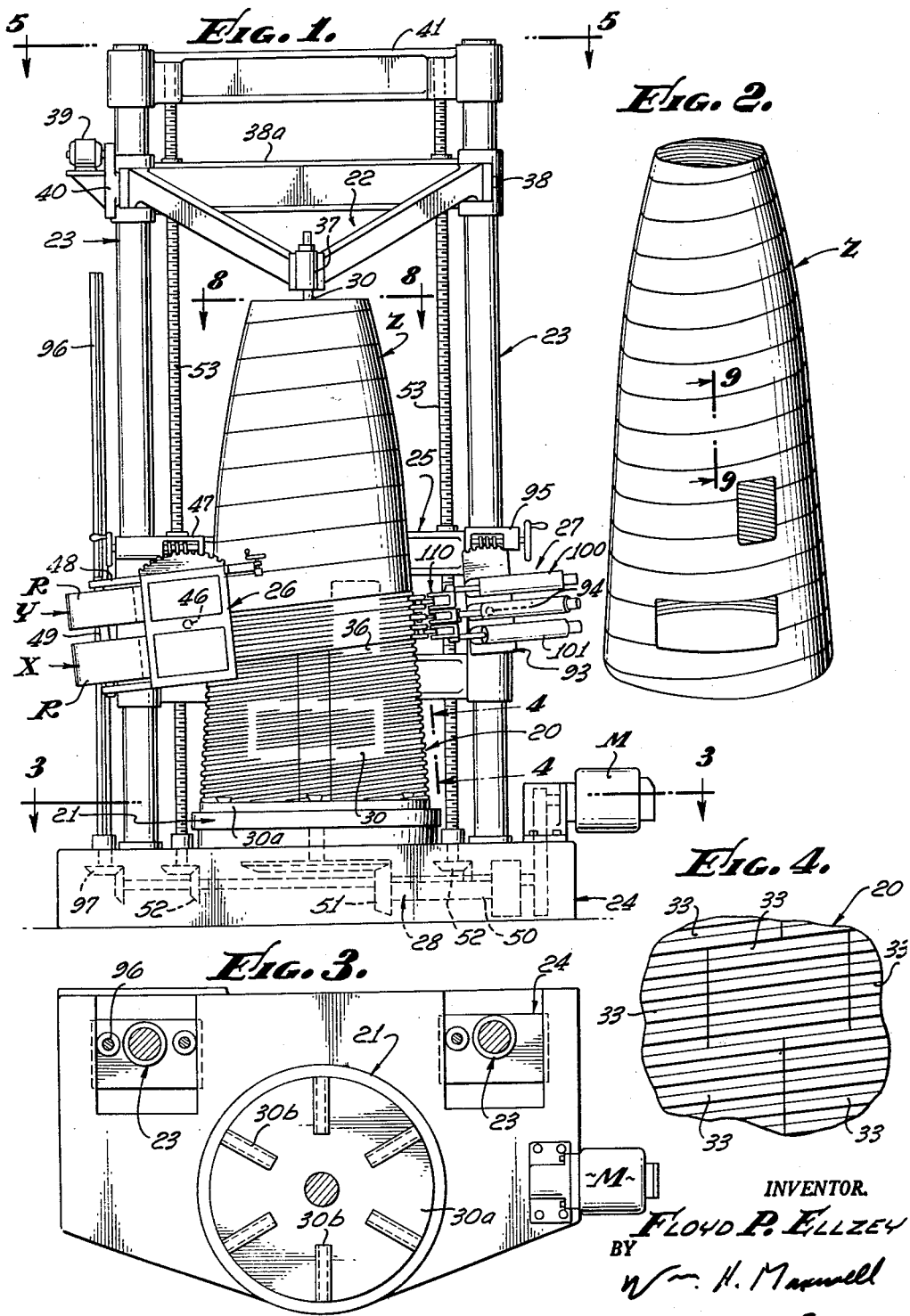

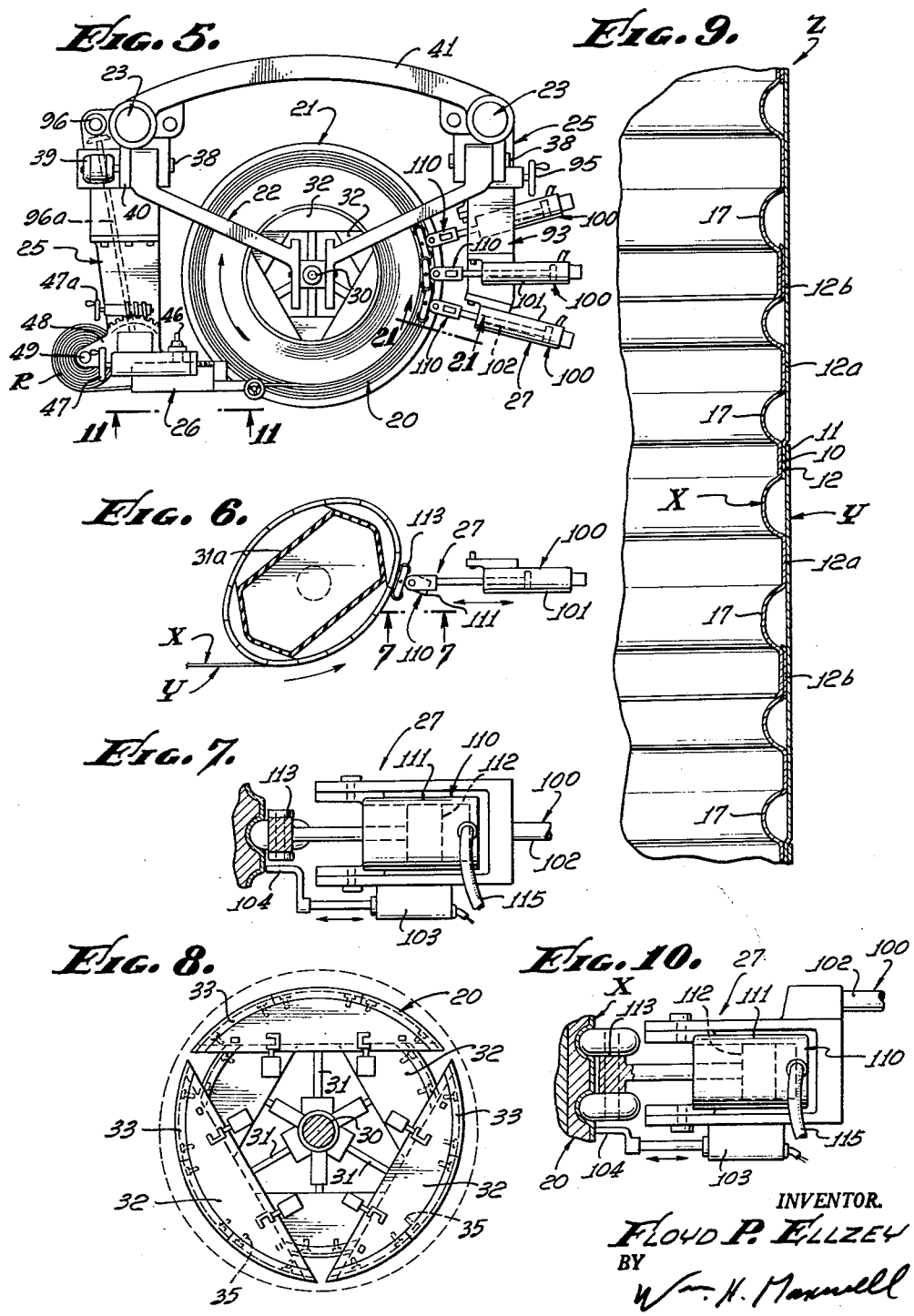

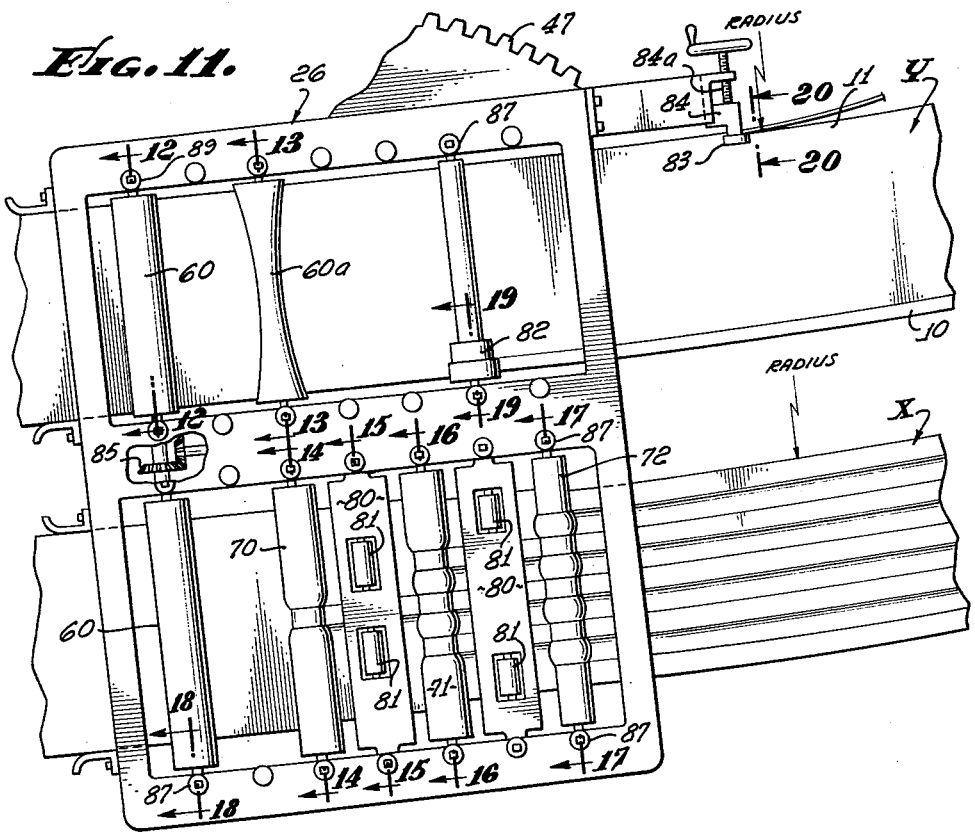

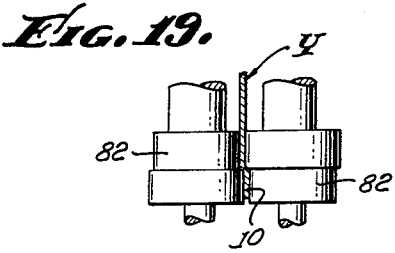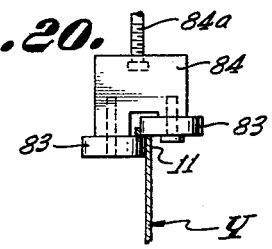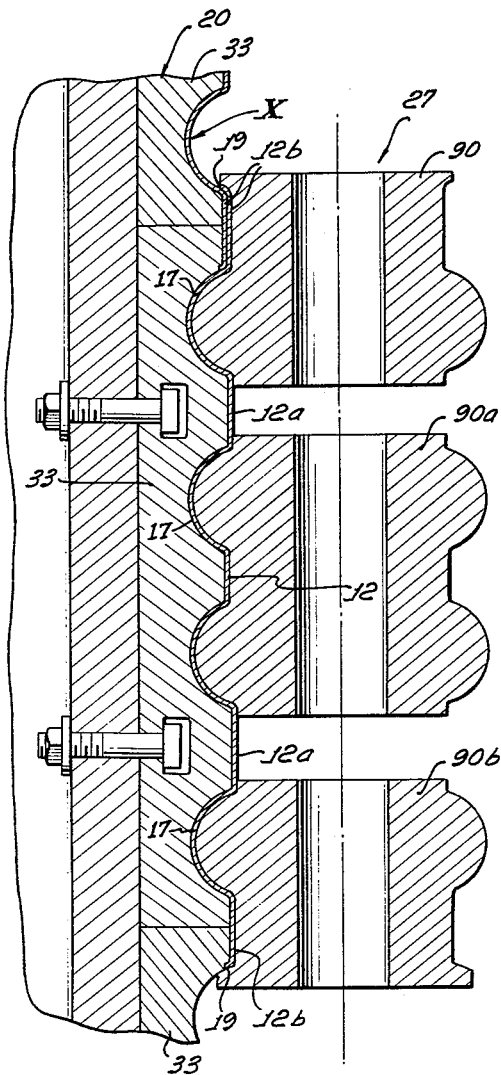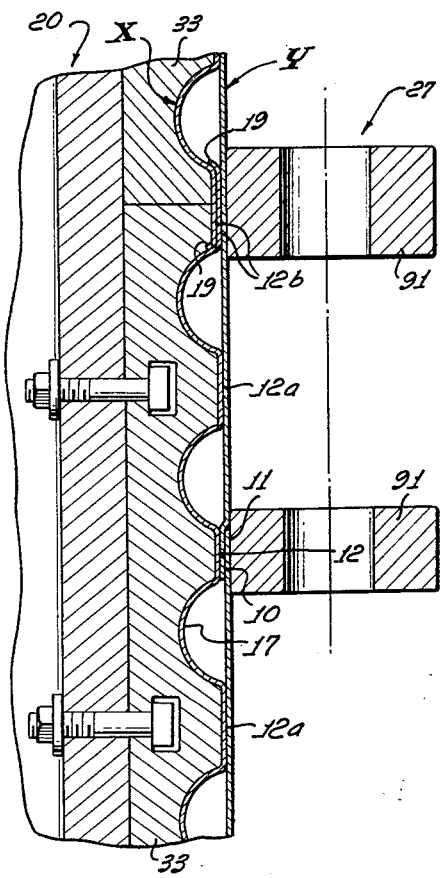
INVENTOR.
Floyd P. Ellzey
BY
Wm H. Maxwell
AGENT.

3,067,707
Patented Dec. 11, 1962

3,067,707
APPARATUS FOR MAKING SPIRALLY WRAPPED
MULTI-LAYER BODY CONSTRUCTION
Floyd P. Ellzey, Hawthorne, Calif.
(2301 Marshallfield Lane, Redondo Beach, Calif.)
Filed Mar. 18, 1957, Ser. No. 646,587
3 Claims. (Cl. 113—35)

This invention has to do with an apparatus for making spirally wrapped multi-layer body constructions and is particularly concerned with a machine for fabricating a spirally wrapped multi-layer structure of sheet metal parts, and it is a general object of my invention to provide a practical machine or mechanism that is adapted to quickly and accurately produce body constructions, or the like, for use, for example, in the building of vehicle bodies, and fuselages, etc.

This application is filed on even date with my copending application Serial No. 646,756, now U.S. Patent No. 3,023,860, granted March 6, 1962, as a continuation in part of my application entitled, "Method of Making Spirally Wrapped Multi-Layer Tube," filed June 1, 1953, Serial No. 358,797, and issued into Patent No. 2,786,435, said application being a continuation of application Serial No. 678,768, filed June 24, 1946, now abandoned.

My present invention is concerned primarily with a machine in the form of a mechanism that is adapted to fabricate or build any body or hollow shell-like structure, for example an aircraft fuselage, or the like. In general, the machine that I provide fabricates bodies or structures of any suitable sheet material. However, my machine is particularly suited for fabrication of sheet metal bodies such, for example as bodies of sheet aluminum alloys and the like.

Further, and in accordance with the broader principles of my invention, the machine, later described is easily modified or adapted to form structures of various sizes, shapes and characters, for instance it may form round cylindrical structures such as the bodies of tanks, or round tapered structures such as may form or enter into the fuselage of an airplane (as shown), or flattened or elliptical structures suitable for wing sections of airplanes. I do not wish the invention limited in any way to the specific form or construction fabricated nor do I wish the invention limited to the fabrication or airplane parts even through I have, in the drawings, illustrated typical aircraft structures fabricated by the apparatus, or machine, of my invention.

It is a general object of my present invention to provide a practical apparatus, or machine, adapted to handle and act upon sheet material, preferably sheet metal, to form and fabricate it into a permanent strong construction characterized in its finished form by inner and outer sheets, the inner sheet being a reinforcing or stiffening element while the outer sheet forms a smooth finished part.

It is another object of my present invention to provide an apparatus, or machine, of the character described capable of operating continuously on one body structure, making it advantageous to employ continuous lengths or strips or sheet material to form said structures which are, in effect, integral units of construction when they are completed by the machine.

A further object of my present invention is to provide a machine of the character above referred to that handles sheet material to form a structure that is essentially monocoque, or of shell-like character. The body structure formed by the machine that I provide is a single unit shell in the form of a body that is fabricated of two elements, one an inner reinforcing element and the other an outer surfacing element.

It is still a further object of my invention to provide a machine of the character thus far referred to that is easily and quickly alterable to form or fabricate body structures of modified shape and form. With the machine that I provide different basic forms or mandrels may be employed, and the surfaces of said forms, or mandrels, are replaceable in sections. The said sections can be removed and replaced with sections of the desired configuration, as circumstances require.

The various objects and features of my invention will be fully understood from the following detailed description of the typical preferred forms and applications of my invention, throughout which description reference is made to the accompanying drawings, in which:

FIG. 1 is a front elevation of the apparatus, or machine, that I have provided showing it in the process of forming a fabricated structure in accordance with the invention. FIG. 2 is a perspective view showing a unit of construction in the form of an elongate tubular structure formed of two continuous strips of sheet material, which structure when finished has a corrugated inner sheet and a plain smooth outer sheet. FIG. 3 is a plan sectional view taken as indicated by line 3—3 on FIG. 1. FIG. 4 is a side elevation of a part of the structure shown in FIG. 1, being a view taken substantially as indicated by line 4—4 on FIG. 1. FIG. 5 is a plan view taken as indicated by line 5—5 on FIG. 1. FIG. 6 is a view similar to a part of FIG 5, showing another form of core that may be employed. FIG. 7 is an enlarged detailed view taken substantially as indicated by line 7—7 on FIG. 6. FIG. 8 is a sectional view taken as indicated by line 8—8 on FIG. 1 illustrating a typical mandrel or core that I may use to carry out my invention and showing said mandrel collapsed. FIG. 9 is an enlarged detailed sectional view through the finished construction that is formed by the apparatus of the present invention, being a view taken as indicated by line 9—9 on FIG. 2. FIG. 10 is a view similar to FIG. 7 but showing a modified form of construction. FIG. 11 is an enlarged side elevation of a portion of the machine, being a view taken substantially as indicated by line 11—11 on FIG. 5. FIGS. 12 to 20, inclusive, are sectional views showing the working parts of the machine and taken as indicated by lines 12—12, 13—13, 14—14, 15—15, 16—16, 17—17, 18—18, 19—19 and 20—20 on FIG. 11, respectively, FIGS. 18, 19 and 20 being enlarged views. FIG. 21 is an enlarged detailed sectional view taken substantially as indicated by line 21—21 on FIG. 5, and showing, collectively, the types of rollers that may be employed in operating the machine, and FIG. 22 is a view similar to FIG. 21 and further showing additional types of rollers that may be employed.

In accordance with the broader principles of my invention the apparatus or machine that I provide handles a plurality of sheets of material which I will refer to as sheet metal. That is, the machine preferably simultaneously handles or works upon two bodies of metal although any suitable number of parts or sheets of metal can be worked upon as circumstances require. In the following description I will refer to a form of my invention wherein the machine works upon two pieces or bodies of sheet metal and I will, for example, refer to these pieces of metal as elongate strips or ribbons of metal. The said strips or ribbons of metal are designated in the drawings as X and Y and when formed or fabricated they establish a shell-like tubular structure Z.

In general, the sheets or strips of metal X and Y are wrapped into an elongate tubular structure with one sheet forming the lining of the structure Z while the other forms the exterior or skin of the structure Z. In the case illustrated, the sheet Y forms the skin of the structure while the sheet X forms the lining of the structure. I prefer to shape one of the strips so that it acts primarily as a stiffening or reinforcing element and ordinarily I prefer to locate this stiffening or reinforcing element inside of the other element or, in other words, I prefer to make the lining X the stiffening or reinforcing element.

In carrying out my invention, I prefer to stagger or offset the wrapping of the two strips to stagger or offset the joints or seams that occur at adjacent parts of the strips. I preferably wrap each strip so that it is generally spiralled or helical in form, and I relate the turns or convolutions so that the edge portions of each strip adjoin, in fact, preferably overlap slightly as I have shown throughout the drawings.

In most cases I contemplate fixing the adjoining or overlapping parts of each strip X and Y together by establishing a seam or joint so that each strip, in and of itself, is in the nature of a complete rigid or permanently formed spiralled structure of the desired cross sectional configuration (see FIG. 9). Further, in carrying out my invention I prefer to stagger or longitudinally offset the joints of the two sheets so that they do not coincide but rather occur at different points lengthwise of the structure, to the end that there is no point in the structure where a joint is formed from the inside to the outside thereof. Furthermore, it is preferred that where the edges of each strip are joined, that is, along the seam of each strip, the said joint or seam is secured or joined to the overlying or adjoining portion of another strip, to the end that the two strips are joined together along the seams of the strips, with the result that the assembled structure is a permanent integral and, in effect, continuous structure.

Further, the strips are wrapped into tubular form and to assure tight fitting of adjoining or overlapping parts of the strips I may initially crown one or both strips, as shown in FIG. 13 of the drawings, so that as the strips are wrapped into cylindrical form the slight crown established in them is flattened somewhat to the end that the edges have a tendency to bear in or toward the center of the structure establishing tight bearing engagement at that point. It is to be understood that said crowning is not always necessary and may be employed only when circumstances require. Furthermore, where I form one strip as the strip X or stiffening element in the finished structure, I preferably corrugate it throughout its width and lengthwise so that it is continuously corrugated as will appear from an examination of the drawings.

A feature of the apparatus, or machine, that I provide is that it partially forms or shapes each strip before wrapping it into the finished structure Z mainly, if not entirely, by bending rather than by stretching so that the metal thickness is affected a minimum amount. That is, I bend the sheet into the desired curved and corrugated cross section and as I have shown in the case of the sheet Y, I bend an offset edge portion at one edge of the sheet to facilitate formation of a flush joint. In the case of corrugating the stiffening sheet or the strip X which I have shown as establishing the lining of the finished structure I prefer to form the corrugations by establishing bends in the sheet and as a consequence of bending the sheet into the desired corrugated form rather than stretching it into this form the sheet contracts or diminishes in width as the corrugations are established, until it is finally of a narrow finished form such as shown in FIG. 11. It is to be understood, however, that a reasonable amount or degree of stretching of the material is permissible without adverse effect on the finished structure.

The spirally wrapped multi-layer body structure Z is fully described and claimed in my copending application Serial No. 646,756, entitled "Body Construction," and involves, generally, the two sheets X and Y. The sheet Y has an edge portion 10 offset or joggled an amount equal to the thickness of the sheet Y so that as the sheet Y is wrapped with its edges overlapping the other edge portion 11 thereof overlaps or nests with the offset edge portion 10. The sheet X begins as a rather wide sheet in flat form. The corrugating operation performed by the apparatus, later described, establishes upstanding ridges 12, 12a and 12b lengthwise of the sheet. The crest of the ridge 12 is slightly depressed or offset to form a land for the reception of the inwardly bent edge portion 10 of sheet Y. There are two ridges 12a, one spaced at each side of the central edge 12 and each has a flat top or land for engagement with the inner side of sheet Y. There are also two ridges 12b, one at each marginal portion of the sheet X and spaced from the ridges 12a. Each ridge 12b has a flat top or land and are formed to overlap, as shown. The lands of the ribs 12, 12a and 12b are joined with each other by curved valley portions 17, and the marginal edges of the sheet X are provided with a slightly inturned lip 19. As a result of the spiralled nature of the wrapped body structure produced, with its corrugated lining strip X, the said strip X when wrapped can be said to be of multi-pitch.

The apparatus, or machine, that I have provided in accordance with the present invention is employed to make or form the unit Z above described. The apparatus or machine is illustrated generally in FIG. 1 of the drawings and involves a core or mandrel unit 20 onto which the strips or material are wrapped in accordance with my method which is described and claimed in Patent No. 2,786,435, a rotatable carrier 21 for the core, a guide frame 22 supplementing the carrier 21 in the handling of the core 20, standards 23 projecting upwardly from a base 24 that carries the carriage 25, a reciprocating carriage 25 supported between standards 23, a head 26 mounted on the carriage 25 and carrying a plurality of rollers which act upon the strip or strips of material to initially bend or shape them in the required manner, pressure means 27 acting to assure tight engagement of the formed strips with the core, means 28 operating the rotatable carrier 21 and the reciprocating carriage 25 in synchronism, and various other parts the details of which will be hereinafter described. It will be observed from FIG. 3 of the drawings that the standards are movable on the base in order to shift the elements carried thereby relative to the central axis of the mandrel or core 20, and in this way cores of varying diameter may be accommodated.

The core or mandrel 20 that I employ in establishing any one form of body structure Z will, in practice, vary widely in form and details, depending upon the shape and details entering into the finished structure Z. In the form of the invention illustrated in FIGS. 1, 5 and 8 of the drawings, I show a core round in cross section and suitable for handling a finished structure having a corrugated lining X, and consequently the core has a multiplicity of parallel grooves so as to be multi-pitch, and it is made collapsible. The collapsible core construction that I have shown in FIG. 8 of the drawings involves, generally, a central or axial stem 30 carrying cylinders that support radially disposed arms or spokes 31 having segmental heads 32 at their outer ends. The collapsible core construction that I have shown in FIG. 6 of the drawings involves, generally, a central fluid handling bag 31a that is either inflated or collapsed to control expanding and collapsing of the core.

The heads 32 have their outer surfaces finished or equipped with sectional blocks or plates 33. The several plates 33 entering into or forming the body of the core around which the strips X and Y are wrapped are arranged in a manner such as is shown in FIG. 4, and with the heads they fit together so that certain of them can be withdrawn as shown in FIG. 8, allowing the core to contract, or the heads can be extended causing the core to be expanded and held in place by suitable locks. In FIG. 8 of the drawings certain of the heads are withdrawn allowing the core structure to be collapsed or contracted and it will be apparent from this figure of the drawings how the several heads can be expanded or moved out until the several heads 32 and their plates 33 register or coincide to form a continuous round surface about which the strips of material can be wrapped, as indicated in dotted lines. In the case where corrugations are provided in the core to fit or correspond to corrugations of the sheet that bears directly on the core, the plates 33 are ribbed or corrugated to the desired finished configuration, as shown in the drawings. The plates 33 are readily removed and replaced so as to easily and quickly modify the mandrel or core as to doors, windows and other openings by operation of suitable fasteners 35. The fasteners 35 have heads engaged in keyed openings in the back or underside of each plate 33, and they extend through the wall of the mandrel 20 to be engaged by nuts, as shown in FIGS. 8 and 21.

When it is desired that the finished structure be provided with interruptions in the corrugations, as for instance, with flattened parts where windows, doors or other openings may be formed in the finished structure, I may interrupt the corrugations in the core as shown at 36 in FIG. 1. Where such panels or doors occur the portion of the structure that is removed may be removed by a suitable cutting operation in individual plates 33, and the panel or portion of the finished structure that is removed may be provided with suitable hardware to be used to cover the opening that it is removed from. When eliminating corrugations at points such as 36 in FIG. 1 the pressure means 27 cooperates with the core in flattening or ironing out corrugations partially established in the strip B, and by locating the parts 36 at the desired points in or along the core I am able to obtain any desired interruption of the corrugated formation of strip X.

The rotating carrier or table 21 supports and rotates the core or mandrel 20 through driving engagement with a base 30a that carries the stem 30 and in the preferred arrangement the table 21 is horizontally disposed and is mounted on a vertical axis so that the base of the core is supported on a vertical axis. The segmental heads 32 of the mandrel 20 have driving engagement with the base 30a through dove-tailed keys 30b that project from the top of the base and extend radially thereof to guide the heads 32 individually. The base 30a is suitably centered and anchored on the table 21. In this case the entire machine or unit X that I am describing may be said to be a vertical machine. However, it will be apparent that I may, in carrying out my invention, arrange the parts at any suitable angle, for instance, they may well be arranged so that the machine is of the horizontal type in which case the axis of the core will be horizontally disposed instead of vertically disposed, as shown in the drawings.

The guide frame 22 that supplements the rotating carrier or table 21 in supporting the core or mandrel 20 preferably includes a frame-like structure having a bearing 37 which rotatably supports the upper end of the core stem 30. The frame carrying the bearing 37 is pivotally carried on pins 38 supported by a cross arm 38a that extends horizontally between the standards 23. The pins 38 are on a common horizontal axis, and the arm 38a may be lifted to move the bearing 37 out of engagement with the stem whereupon the frame 22 can be swung up out of the way allowing the core to be manipulated or handled relative to the table 21 as circumstances may require.

In a large machine I may provide a power means for swinging the frame 22, for instance, I may provide a suitable motor 39 connected with the frame 22 through a suitable drive 40.

The standards 23 which may vary in number and arrangement as circumstances require preferably extend from the base 24 to be parallel with the core 20 when it is supported in the machine. In the case illustrated I have shown two standards 23 extending upwardly from the base 24 and tied together at their upper ends by a tie member 41. The reciprocating carriage 25 is in the nature of a cross head or slide supported by the standards 23 to move lengthwise thereof and it serves as a mounting or support for the head 26 and pressure means 27.

The head 26 is a cage-like frame structure pivotally mounted on the carriage 25 on a horizontal axis as, for instance, on a pivot pin 46 so that it can be tilted to a suitable angle such as is shown in FIGS. 1 and 11. A suitable gear mechanism 47 is provided for adjusting and holding the head in the desired angular position relative to the carriage and consequently relative to the core on which the strips of material are wrapped. A suitable drive 96a is provided between the shaft 96, hereinafter described, and the gear mechanism 47 so that the head may be progressively adjusted as the machine operates when this adjustment is necessary. Further, as shown in FIG. 5, the head 26 can be turned horizontally about a vertical axis by means of a suitable gear mechanism 47a.

The head 26 has spaced arms 48 which support pins 49 carrying rolls R of strip material which is to be passed through the head and onto the core. In the general operation of the machine the leading or starting ends of the strips X and Y are fixed to the core, for instance, in the case illustrated in FIG. 1 to the small end portion of the core, and the head 26 is set at the desired angle through the gear 47, whereupon the core is rotated so that the strip material from the rolls R is wound or drawn onto the core from the rolls R and in reaching the core passes through the structure supported by the head 26. By winding the strips of material onto the core with suitable drag or tension the strips X and Y are drawn tight onto the core bringing their wrapped edges into tight bearing engagement and bringing one strip into tight bearing engagement with the other. In the preferred form of my invention I employ means to synchronize the motion of the core 20 with the carriage 25 or, in other words, I synchronize rotation of the table 21 with linear movement of carriage 25 to the end that the strips X and Y are advanced lengthwise of the core at the proper rate as the core revolves or is turned.

In the case illustrated I show a source of power or prime mover M which drives a main shaft 50. The shaft 50 acts through suitable gears 51 to rotate the table 21 and it acts through suitable gears 52 and screws 53 to move the carriage 25 lengthwise of the standards 23. It will be understood how the parts just described can be related so that the desired synchronism is gained between the rotation of the table 21 and the linear movement of carriage 25.

The head 26 carries a set of rollers acting primarily to bend each sheet or strip of material in the desired manner. Where there are two strips of material being handled the head carries primarily two or more sets of rollers and where the machine is a vertically disposed structure, as shown in the drawings, I provide what I will term an upper set of rollers to handle the uppermost sheet which in this case is the skin or outer sheet Y and a lowermost set of rollers provided to handle the innermost sheet or liner strip X. It is to be understood that two or more upper sets of rollers and two or more lower sets of rollers may be used if desired. Where the innermost sheet or strip X is merely to be slightly crowned transversely it is ordinarily unnecessary to establish an initial crown in said strip. In the case illustrated both sheets X and Y are initially passed through flattening or pressure rollers 60. I show cooperating pressure rollers 60 suitably supported in bearings carried by head 26 so that the strips X and Y are held as they pass between them (see FIGS. 11 and 12). When the skin or outer strip Y is to be slightly crowned transversely a concave roller 60a is provided and acts against a large convex roller 60b. As the sheet or strip Y passes through the rollers 60a and 60b the sheet is crowned transversely (see FIG. 13).

In the case of the rollers provided to act on the strip X, I provide the pair of rollers 60 which serve to give each strip X and Y the desired stretch, as later described, and I provide pairs of rollers acting on the strip X which serve to establish the desired ribs or corrugations in the strip giving it the desired corrugated cross sectional configuration. For this purpose I provide what I will term a first pair of corrugating rollers 70 which cooperate to bend the sheet X in a manner to establish the rib or ridge 12 therein (see FIG. 14), a second pair of corrugating rollers 71 which cooperate to bend the sheet X in a manner to establish the ribs 12a at each side of rib 12 (see FIG. 16), and a third pair of corrugating rollers 72 which cooperate to bend the sheet X in a manner to establish the ribs 12b that I have described above. In accordance with my invention the pairs of rollers 70, 71 and 72 are formed so that they act to partially bend and/or stretch the strip X into an initial preformed cross-sectional configuration, or rough shape, preferably equal to about 50% of the final or finished shape of the strip X when it is finally formed on the plates 33 of the mandrel 20.

Referring to FIGS. 11 and 14 of the drawings, the pair of rollers 70 are essentially like cylindrical rollers with mating formations at the center portion thereof adapted to raise the ridge 12 in the sheet or strip X. As shown, one roller 70 has a depression therein while the other roller 70 has a protruding part that enters the said depression to bend the material or sheet X that passes between the rollers. Where the ridge has a flat land, the depression and said protruding part have co-operating flat portions.

Referring to FIGS. 11 and 16 of the drawings, the pair of rollers 71 are essentially like cylindrical rollers with mating formations spaced from the center portions thereof and adapted to raise the ridges 12a in the sheet or strip X. The rollers 71, like the rollers 70, have mating depressions and protruding parts with flattened portions to form the corresponding ridges 12a.

Referring to FIGS. 11 and 17 of the drawings, the pair of rollers 72 are essentially like cylindrical rollers with mating formations spaced from the center portion thereof and adapted to raise the ridges 12b in the sheet or strip X. The rollers 72 like the rollers 70 and 71, have mating depressions and protruding parts with flattened portions to form the corresponding ribs 12b.

In the preferred form of my invention bridge members 80 are provided on the head 26 intermediate each set of forming rollers above described acting to establish a rib or ribs in the sheet X and pairs of flattening or shrinking rollers 81 are carried by the bridges 80 to flatten or shrink the material of sheet X between the separate forming operations to the end that the sheet X is bent into the desired cross section in a most advantageous manner. The manner in which the pairs of rollers 81 cooperate with the pairs of main rollers will be clearly understood from an examination of FIGS. 11 and 15 of the drawings.

In addition to the main rollers 70, 71 and 72 which roughly preform the sheet X, the head 26 involves a pair of joggling rollers 82, and a pair of shearing rollers 83, adapted to joggle one edge of the sheet Y and to trim the other edge thereof. As above described the sheet Y has an offset edge portion 10 and a flat edge portion 11. The jogging rollers 82 are provided to form the offset edge portion 10 in the sheet Y, while the shearing rollers 83 are provided to trim the edge portion 11 so that the sheet Y is of the exact desired width.

Referring to FIGS. 11 and 19 of the drawings, the pair of rollers 82 are essentially like cylindrical rollers with mating formations at or overlying the marginal portion 10 of the sheet Y, and adapted to offset said portion one metal thickness of the sheet. As shown, one roller 82 has a depression therein while the other roller 82 has a protruding part to the end that the portion 10 is joggled as the sheet Y passes between the rollers.

Referring to FIGS. 11 and 20 of the drawings, the pair of shearing rollers 83 are disc-shaped elements with their peripheries cooperatively related and lapped so that sheet material passed between the rollers is divided or cut. The pair of rollers is shiftably carried by a block 84 that can be selectively positioned by a feed screw 84a, or the like, under control of a hand wheel. It will be apparent that the block 84 is easily set to cut or shear the sheet Y at the desired angle and to the exact desired width so that the joinder between convolutions of the sheet is flush and smooth. Further (but not shown), a feeler or guide means may be employed to engage the edge of the sheet material on the mandrel onto which the material being wrapped is to be laid, in order to control the point of cutting or shearing.

In carrying out my invention I may merely pass the strips of material X and Y through the head 26 and consequently through the rollers of the head or, as I prefer, I may drive the rollers or at least some of the various pairs of rollers or one roller of each pair together by gears 85. In the apparatus that I have provided I have a splined drive shaft 96 extending parallel to the standards 23 adjacent the head 26 and driven by gears 97 to operate in synchronism with the core or mandrel 20 and carriage 25. The shaft 96 is provided with a driving member that can be suitably coupled to the gear train 85, if desired. If light, fragile material is employed a power drive may be provided for operating the rollers at the desired speed or in synchronism with the rotation of the core, whereas if a more substantial material is being used I can eliminate even the gear connections 85 and merely let the sheets drag through the rollers.

In FIG. 18 of the drawings, I have illustrated a typical means for applying the required pressure to the rollers 60, 60a, 70, 71, 72 and 82, and to the bridges 80. When pairs of rollers are to be urged into pressure engagement with each other I provide means at each end of said pairs of rollers for urging them into pressured engagement in order to grip and press the sheet X or Y therebetween, as the case may be. As shown, the end of the roller is rotatably carried in a shiftable pillow block 86. The block 86 is movable relative to the head 26 and an adjusting part in the form of a screw 87 is carried by the head 26 and positioned to oppose the block 86. A compression spring 88 is interposed between the screw 87 and block 86 so that turning of the screw adjustably compressees the spring to gain the desired pressure between the rollers.

Where the strips are to be formed into a tapered structure or a structure characterized by a longitudinally curved contour as shown in FIG. 2 of the drawings, I adjust the rollers 60 in a manner which serves to slightly stretch strips X and Y in the desired manner, or from the upper edge to the lower edge thereof as indicated by the radius lines shown in FIG. 11. The stretching is accomplished progressively between the two edges so that the sheets are stretched a minimum amount at the upper edge and a maximum amount at the lower edge thereof. In the case illustrated the two pairs of rollers 60 effectively grip and compress the strips while the remainder of the rollers act to drive the strips through the head 26, or while the mandrel 20 pulls the strip through the head. By adjusting the pressure applied to the opposite ends of the rollers 60 by means of the spring 88 or by positively positioning the rollers 60 by means of micrometer type calibrating screws, the lower edge of the strip is somewhat flattened and thereby caused to stretch as the strip is guided onto the mandrel 20 at the proper angle. For example, the lower ends of the rollers 60 are held together tighter than the upper ends thereof to the end that the lower edge of the strip is flattened slightly and stretched relative to the top edge thereof.

The pressure means 27 that I have provided preferably acts on one or both of the strips of material and serves to press it firmly into engagement with the core. In the particular case illustrated, that is, where I provide a corrugated liner sheet or strip X, it is advantageous to provide substantial pressure for pressing the strip X into tight seating engagement with the core 20, whereas where the outer sheet is a plain smooth sheet it is ordinarily unnecessary to provide great pressure. As pointed out above it is desirable to only partially form the sheet X in the head 26, say for instance about 50%, and to finish forming the sheet by pressing it against or rolling it against the core. I may in some instances completely form the corrugations with the rollers in the head 26, or in some instance completely form the corrugations on the mandrel 20.

Referring to FIGS. 21 and 22, the pressure means 27, as shown, involves pressure rollers 90 and 91 the face or periphery of which corresponds to the contour of the sheet or strip to be pressed into engagement with the mandrel 20. A head 93 carries the rollers 90 and 91 in a position to engage with the sheets X and Y, respectively, at the periphery of the mandrel 20. The head 93 of means 27 is carried by the carriage 25 to progress lengthwise of the core as the machine operates, and consequently it remains in proper mesh with the strips as the strips are fed onto the core and serves not only as a means for pressing the strips onto the core but for maintaining proper mesh of the strip X with the core and of the strip Y with the strip X.

The means 27 involves the head 93, like the head 26 above described, pivotably mounted on the carriage 25 on a horizontal axis as, for instance, on a pivot 94 (see FIG. 1) so that it can be tilted to a suitable angle. A suitable gear mechanism 95 is provided for adjusting and holding the head 93 in the desired angular position relative to the carriage and consequently relative to the core on which the strips of material are wrapped. A suitable drive (not shown) may be provided between the shaft 96, above described, and the gear mechanism 95 so that the head 93 may be progressively adjusted as the machine operates when this adjustment is necessary. The head 93 is set at the desired angle through gear 95 whereupon the core is rotated so that the strip material from the rolls R is wound onto the core and is engaged by the rollers 90 and 91.

In accordance with the present invention, I provide means 100 for positioning the rollers 90 and 91, and means 110 for yieldingly urging the said rollers into pressure engagement with sheets X and Y on the mandrel 20. As clearly illustrated in FIGS. 1 and 5 the means 100 and 110 are carried by the head 93, there being a plurality of positioning means 100 each carrying a means 110 for urging or pressing one or more rollers into engagement with the sheets on the mandrel 20. In the case illustrated, there are three units of construction carried by the head 23, or three positioning means 100 and three means 110.

The several means 100 may be alike and each is a hydraulically operated cylinder and piston means involving, generally, a cylinder 101, a piston and rod 102, and means 103 for positioning the piston and rod 102 relative to the cylinder 101. The cylinder 101 is on an axis extending radially from the central axis of the mandrel 20, the axis of the cylinder being maintained at an angle normal to the surface of mandrel 20 by the gear mechanism 95 above described. The piston and rod 102 operate from the inner end of the cylinder 101, the means 110 being carried at the inner end of the rod. The means 103 for positioning the piston and rod 102 is a position sensing means involving a probe 104 carried at the inner end of the piston rod, preferably on the means 110, and engageable with the sheet X or Y as the case may be, at the periphery of the mandrel 20. The probe 104 may operate suitable switches (not shown) that control valves (not shown) for governing the position of the piston in the cylinder 101.

The means 110 for yieldingly urging the rollers 90 and 91 into pressure engagement with the sheets X and Y may vary in form and is preferably a hydraulic actuated means involving, generally, a cylinder 111, a piston 112, and a cross-head 113 carried on a rod projecting from the piston 112. The cylinder 111 is rotatably carried on a vertically disposed axis at the inner end of the piston and rod 102, there being means to prevent rotation of said piston and rod. The piston 112 is slidable in to cylinder 111 and carries a rod 114 that projects inwardly toward the periphery of the mandrel 20. The cross-head 113 is rigidly connected to the innermost end of the piston rod 114 and circumferentially spaced rollers are carried by the cross-head. With this arrangement of elements the axis of the means 110 is maintained at an angle normal to the periphery of the mandrel 20 and to the surface of the sheet being acted upon (see FIG. 6). Hydraulic pressure, or the like, is applied to the cylinder 111 through a connection 115 and is under control of a suitable pressure regulator (not shown) in order to control the force with which the rollers are urged toward the mandrel.

In FIG. 21 of the drawings I have illustrated the rollers 90 which are adapted to form the sheet X into final form by pressing said sheet into tight engagement with the plates 33 on the mandrel 20. I have shown three typical rollers 90, 90a and 90b, it being understood that said rollers will vary as the configuration of the corrugations vary. Roller 90 is shaped to form the upper lip 19 and the uppermost corrugation at 17, while the roller 90b is shaped to form the lower lip 19 and the lowermost corrugation at 17. The roller 90a is shaped to form the intermediate corrugations at 17. Each roller may be employed in connection with one or more of the pressure exerting means 110 to form the sheet X into final form on the mandrel 20.

In FIG. 22 of the drawings I have illustrated the rollers 91 which are adapted to press the sheet Y onto the mandrel overlying the sheet X. I have illustrated two like rollers 91 having flat faces to engage the flat periphery of the sheet Y forming the smooth exterior to the body structure Z.

The rollers 90, 90a, 90b, and 91 are urged into the desired pressure engagement with the sheets X and Y in order to properly form them into the desired configuration conforming to the surface configuration of the mandrel 20. As the wrapping of the body structure Z progresses other special forming steps and processes may be carried out, for example the flattening and shrinking of the sheet X as it is wrapped over the portions 36 on the mandrel 20.

From the foregoing detailed description it will be apparent that I have provided an apparatus or machine that is employed to quickly and cheaply manufacture bodies of shell-like or tubular form. Mandrels 20 of most any shape or contour and/or grooved configuration can be quickly applied to the machine for the reception of the strips of material that form the finished structural body Z. With the desired grooves and flattened portions formed in the mandrel 20 it is a simple and expedient matter to wrap the sheets X and Y onto the mandrel after which operation the sheets are suitably trimmed and temporarily or permanently fastened together, and the mandrel is collapsed and the finished structure Z removed therefrom.

After removal of the structure Z from the mandrel 20, the finishing operations including incorporation of additional assemblies and of securing the sheets X and Y together are performed.

Having described only the typical preferred forms and applications of my invention, I do not wish to be limited or restricted to the specific details herein set forth, but wish to reserve to myself any variations or modifications that may appear to those skilled in the art and fall within the scope of the following claim.

Having described my invention, I claim:

1. Apparatus of the character described including, a multi-pitch grooved mandrel, means mounting the mandrel for rotation, a carriage having a head, means mounting the head for movement axially of the mandrel, a set of rollers carried by the head to act on a strip of sheet material on the mandrel, and means synchronizing rotation of the mandrel and said axial movement of the carriage and head, the set of rollers including a plurality of pairs of rollers acting on the sheet successively to bend ridges in it one after another to render the sheet corrugated in cross sectional configuration whereby said sheet conforms to the grooved mandrel.

2. Apparatus of the character described including, a multi-pitch grooved mandrel having a tapered exterior form, means mounting the mandrel for rotation, a carriage having a head, means mounting the head for movement axially of the mandrel, sets of rollers carried by the head to act on a substantially wide strip of sheet material as it is fed to and after it is wrapped on the mandrel, and means synchronizing rotation of the mandrel and said axial movement of the carriage and head, the sets of rollers including rollers stretching the strip of material slightly edgewise of the strip as it is fed to the mandrel and a plurality of pairs of rollers acting on the sheet wrapped on the mandrel successively to bend ridges in it one after another to render the sheet corrugated in cross sectional configuration whereby said sheet conforms to the exterior of the mandrel when wrapped thereon.

3. Apparatus of the character described including, a multi-pitch grooved mandrel having a tapered exterior form, means mounting the mandrel for rotation, a carriage having a head, means mounting the head for movement axially of the mandrel, sets of rollers carried by the head to act on a substantially wide strip of sheet material as it is fed to and after it is wrapped on the mandrel, and means synchronizing rotation of the mandrel and said axial movement of the carriage and head, the sets of rollers including rollers stretching the strip of material slightly edgewise of the strip as it is fed to the mandrel and rollers forming the sheet wrapped on the mandrel successively to bend ridges in it one after another, the set of stretching rollers acting on the sheet at the center portion thereof and each successive set of rollers acting on a portion of the sheet toward the side of the sheet from the portion previously acted upon and to render the sheet corrugated in cross sectional configuration whereby said sheet conforms generally to the grooved mandrel when wrapped thereon, and the set of forming rollers acting on the sheet wrapped on the mandrel to render the sheet corrugated to the exact cross-sectional configuration of the mandrel.

References Cited in the file of this patent

UNITED STATES PATENTS

| | | |
|---|---|---|
| 1,009,732 | Fisher | Nov. 28, 1911 |
| 1,070,268 | Lawton | Aug. 12, 1913 |
| 1,155,389 | Wainwright et al. | Oct. 5, 1915 |
| 1,159,798 | Reynders | Nov. 9, 1915 |
| 1,288,134 | Naylor | Dec. 17, 1918 |
| 1,580,760 | Palmer | Apr. 13, 1926 |
| 1,659,792 | Thorsby | Feb. 21, 1928 |
| 1,726,279 | Werner | Aug. 27, 1929 |
| 1,799,918 | Marsden | Apr. 7, 1931 |
| 2,008,423 | Ritchie | Dec. 10, 1934 |
| 2,136,942 | Freeze | Nov. 15, 1938 |
| 2,155,859 | Harford | Apr. 25, 1939 |
| 2,314,510 | Odor | Mar. 23, 1943 |
| 2,351,152 | Schick | June 13, 1944 |

FOREIGN PATENTS

| | | |
|---|---|---|
| 108,257 | Australia | Aug. 14, 1939 |